May 22, 1956  A. B. FONDA ET AL  2,746,830
ROTATING RECEPTACLE STRUCTURE FOR HOUSEHOLD REFRIGERATORS
Filed May 20, 1954  2 Sheets-Sheet 1

INVENTOR.
ALLEN B. FONDA &
JULIUS B. HORVAY
BY *Sheridan Byrd*
THEIR ATTORNEY

May 22, 1956  A. B. FONDA ET AL  2,746,830
ROTATING RECEPTACLE STRUCTURE FOR HOUSEHOLD REFRIGERATORS
Filed May 20, 1954  2 Sheets-Sheet 2

*INVENTOR.*
ALLEN B. FONDA &
JULIUS B. HORVAY

BY *Sheridan & ...*

THEIR ATTORNEY

United States Patent Office 2,746,830
Patented May 22, 1956

2,746,830

ROTATING RECEPTACLE STRUCTURE FOR HOUSEHOLD REFRIGERATORS

Allen B. Fonda and Julius B. Horvay, Erie, Pa., assignors to General Electric Company, a corporation of New York Application May 20, 1954, Serial No. 431,212

8 Claims. (Cl. 312—270)

Our invention relates to storage receptacles for use in household refrigerators and more particularly to rotatable receptacle structures for such use.

In order to increase the accessibility to the contents of a refrigerator cabinet, rotatable shelves may be provided therein. Through the rotation of these shelves any portion thereof may be brought to the front of the cabinet to allow the ready removal of foodstuffs stored thereon. However, the vegetable pans or other storage receptacles included in these rotating shelf refrigerators have not ordinarily been provided with a rotatable mount. Because of the difficulties encountered with the covers of these pans or receptacles, it has heretofore been advantageous to use sliding rather than rotating receptacles, even though the rotating receptacles are much easier to move to an outward accessible position. Specifically with vegetable pans these difficulties stem from the fact that the pan must, of course, be uncovered in its outward position if access to its contents is to be had, but it must be re-covered when it is returned to its normal position if moisture loss from the vegetables is to be prevented. For a satisfactory structure both the uncovering and the re-covering of the pan should be accomplished automatically.

Accordingly, it is a primary object of our invention to provide a new and improved rotatable receptacle structure for use in household refrigerators, which includes novel means for both automatically uncovering the access opening to the receptacle as it is rotated outwardly and re-covering the access opening as the receptacle is returned to its normal position.

It is another object of our invention to provide an improved rotatable receptacle structure for use in household refrigerators, which includes a novel lid releasably attached to the refrigerator liner and adapted to automatically uncover the receptacle as it is rotated outward and re-cover it as it is returned to its normal position.

A further object of our invention is to provide an improved rotatable receptacle structure for use in household refrigerators which includes a novel lid for automatically uncovering and re-covering the receptacle and manually releasable stop means mounted on the lid for limiting the rotation of the receptacle.

In carrying our invention into effect we provide a refrigerator cabinet having an inner liner which defines a food storage compartment. Within this compartment we mount our new and improved rotatable receptacle structure. The structure includes a receptacle which is rotatably mounted by suitable means, preferably by means of a vertical shaft. The receptacle has a normal position wherein it fits completely within the storage compartment and it may be rotated outwardly from this normal position in either direction to provide access to its contents. The access opening to the receptacle is formed in the top thereof. For covering the access opening we provide a lid which is slidably mounted on the receptacle. This lid is adapted to cover the access opening when the receptacle is in its normal position and it is attached by suitable means to the inner liner so that it is held stationary as the receptacle is rotated. Due to the lid being held stationary the result is that the access opening is uncovered by the relative motion between the lid and the receptacle upon the rotation of the receptacle outwardly from its normal position. Moreover the access opening is automatically re-covered upon the rotation of the receptacle back into its normal position. In our preferred embodiment the means attaching the lid to the liner are manually releasable so that if desired the receptacle and the lid may be rotated outwardly together as a unit. In fact our preferred means include a bifurcated member and a block member releasably engaged by the bifurcated member, one of these members being mounted on the lid and the other being mounted on the liner. The lid may be released from the liner simply by pivoting the bifurcated member out of engagement with the block member. In our preferred embodiment means are also provided for limiting the rotation of the receptacle to a predetermined amount in either direction from its normal posiiton. This means in its preferred form comprises a movable pin member mounted on the lid and adapted to engage a wall of the receptacle upon the receptacle being rotated the predetermined amount from its normal position.

The novel features which are believed to be characteristic of our invention are set forth with particularity in the appended claims. Our invention itself, however, both as to its organization and mode of operation may be best understood by reference to the following description taken in conjunction with the accompanying drawings in which:

Figure 2:
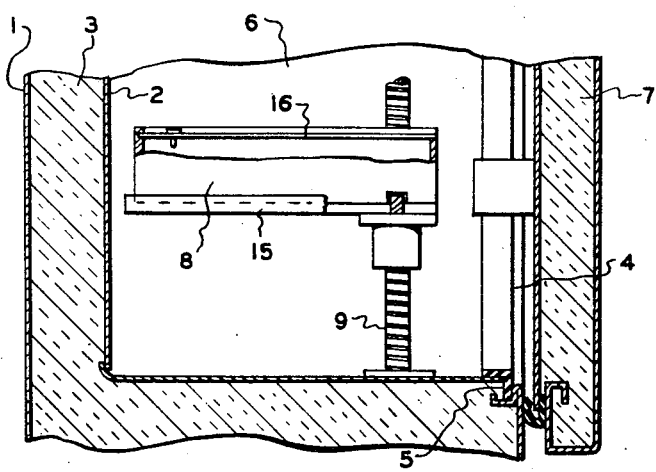
Fig. 2 is a fragmentary elevation view, partially in section, of a refrigerator cabinet including the preferred receptacle structure of Fig. 1.

Referring now to Fig. 2 we have illustrated therein the lower portion of a refrigerator cabinet which includes an outer metal wall 1 and an inner metal wall or liner 2, the space between the walls being filled with a suitable heat insulating material 3. The walls are formed to provide a door opening 4 at the front of the cabinet, and the space between the walls in the area of the door frame is closed by a breaker strip 5 of suitable heat insulating material. The space 6 defined by the liner 2 comprises the food storage compartment of the cabinet and the door opening 4, of course, provides access to that compartment. The opening 4 may be closed by any suitable insulated door, as for example the insulated door 7.

Within the food storage compartment 6 there is mounted a preferred embodiment of our new and improved rotatable receptacle structure. In this preferred embodiment a generally semi-circular vegetable pan or receptacle 8 is rotatably mounted by means of a threaded shaft 9 which extends vertically upward within the compartment. This shaft 9 may also, if desired, be used to mount a plurality of rotatable shelves as well as the receptacle 8 although such shelves are not here shown. For mounting the receptacle the shaft 9 has threaded thereon a collar or bearing member 10. This bearing 10, which through its threaded engagement with the shaft may be positioned at any point along the shaft, serves as the supporting means for a hub or sleeve 11 which also surrounds the shaft. The hub 11 is, however, not mounted in threaded engagement with the shaft but rather may be freely rotated therearound. Moreover, the hub is not secured to the collar 10 but merely rests thereon so as to be rotatable with respect to the collar. In fact, in order to provide for free rotation of the hub 11 a nylon washer may be interposed between hub and the collar and a nylon bushing may be placed between the hub and the shaft 9.

Figure 1:
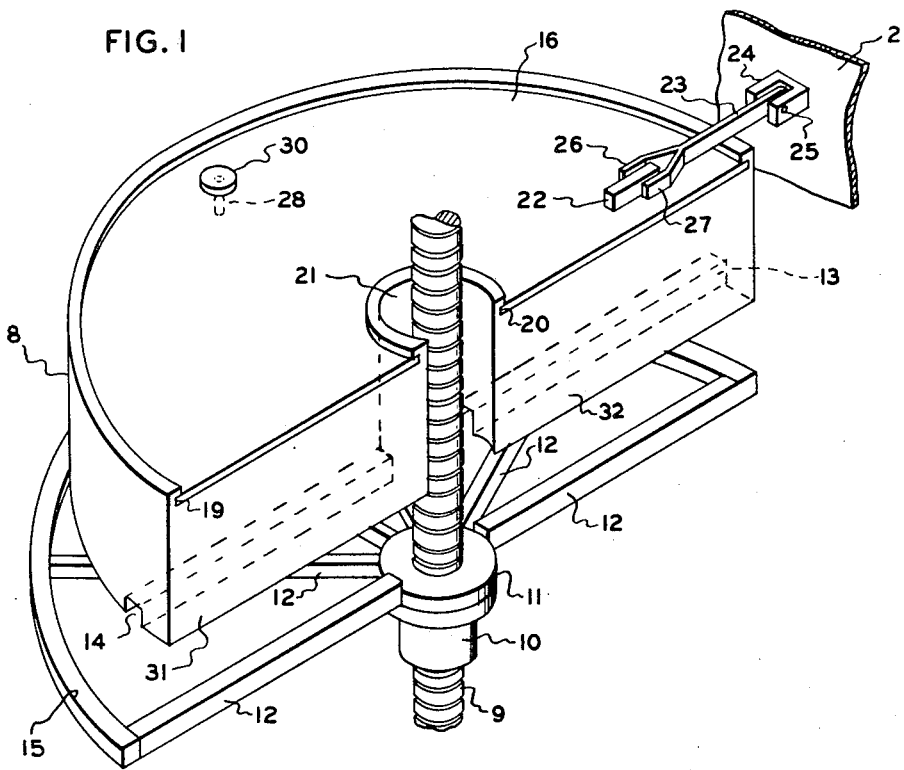
Fig. 1 is a perspective view of a preferred embodiment of our new and improved rotatable receptacle structure.

As may be best seen in Fig. 1, the receptacle 8 is rotatably supported by means of a plurality of spoke members 12 which radiate outwardly from hub 11. These spoke members 12, which are firmly secured to the hub 11 and rotate therewith, form a semi-circular rotatable mount on which the receptacle 8 rests when placed in position. In order to transmit positively the motion of the hub and the spoke members to the receptacle a pair of grooves 13 and 14 may be provided in the front portion of the bottom surface of the receptacle. These grooves 13 and 14 fit over the front two spoke members 12 so that the receptacle is firmly keyed to the spoke members and hub for rotation therewith. The manner in which the grooves 13 and 14 fit over the front two spoke members 12 may be clearly seen in Fig. 1. It should be noted incidentally that these two front spoke members are raised slightly higher than the other spokes so that they will engage the tops of the grooves at the same time as the other spokes engage the bottom of the receptacle. This, of course, prevents the receptacle from tilting forward.

Further in order to prevent the receptacle from moving sideways off the spoke members 12, a semi-circular frame member 15 is provided which is attached to and joins together the outer ends of the spokes. This semi-circular frame member 15 has a radius slightly greater than that of the semi-circular outer side of the receptacle and is raised above all the spoke members 12 except the front two. The frame member thus surrounds the lower portion of the semi-circular outer side of receptacle 8 and through its engagement therewith holds the receptacle in position. The presence of the frame member, of course, also tends to strengthen the base formed by the spoke members.

Figure 3:
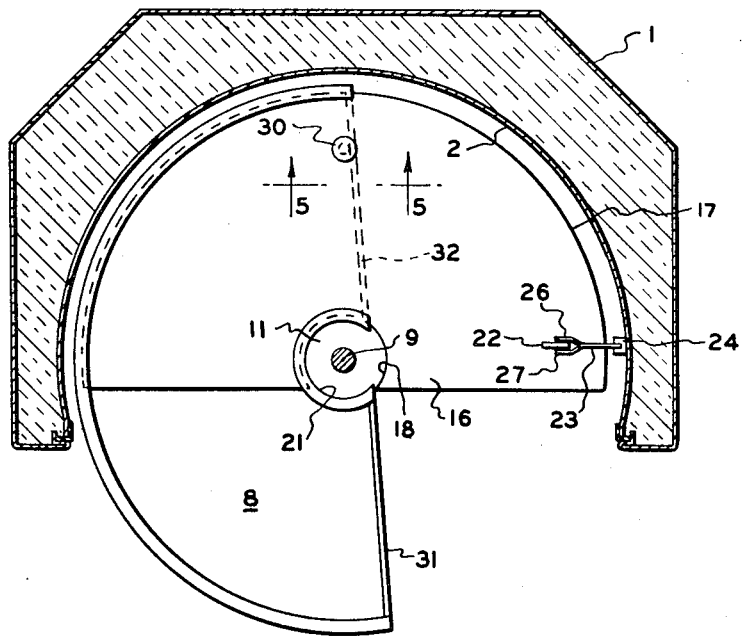
Fig. 3 is a diagrammatic sectional view showing the receptacle rotated to a position providing access to its contents.

As a result of this rotatable mounting of the spoke members 12 the receptacle 8 may be rotated outwardly from its normal position shown in Figs. 1 and 2 so as to provide access to its contents. In our preferred embodiment the access opening to the receptacle 8 is provided in the top thereof, the entire top in fact being open. Since however the receptacle 8 is intended primarily for use as a vegetable pan its open top is normally covered by means of a lid 16; and in accordance with our invention this lid 16 is adapted to uncover the open top or access opening to the receptacle 8 as the receptacle is rotated outwardly from its normal position and to re-cover the access opening as the receptacle is returned to its normal position. To accomplish that result the lid 16 is mounted so that it may move relative to the receptacle 8. Specifically, in our preferred embodiment the lid is slidably mounted on the receptacle to provide for the relative movement therebetween. As best shown in Fig. 3 the lid 16 is provided with an outer curved edge 17 and an inner curved edge 18. These curved edges of the lid are each accommodated in a curved groove provided in the receptacle, the outer edge 17 of the lid being accommodated by a groove 19 in the outer curved wall of the receptacle and the inner edge 18 of the lid being accommodated by a groove 20 in the front wall of the receptacle, the grooves being shown in Fig. 1. More exactly, the groove 20 is formed in a curved portion 21 of the front wall of the receptacle, which extends around the shaft 9. As the receptacle is rotated the edges of the lid may slide within the grooves so as to provide for relative rotation between the receptacle and the lid.

To cause the lid to open the top of the receptacle as it is rotated outwardly from its normal position, we have provided means for retaining the lid stationary while the receptacle is rotated outwardly. Preferably this means is releasable so that it may be disengaged, if desired, to allow the lid to rotate with the receptacle. As shown in Fig. 1 this means in its preferred form comprises a pair of releasably engaged members 22 and 23 one of which is mounted on the lid 16 and the other of which is attached to the liner or wall 2. In their illustrated forms the member 22 comprises a block or tab protruding upwardly from the top of the lid 16 whereas the member 23 comprises a bifurcated member which is pivoted to the liner by means of a clevis 24 and a pin 25. When the bifurcated member 23 is pivoted downwardly so that the two prongs 26 and 27 thereof lie on opposite sides of the block 22, the lid 16 is thereupon held against rotation no matter in which way the receptacle 8 itself is turned. However, if the bifurcated member 23 is moved upwardly so that the prongs 26 and 27 clear the member 22, the lid 16 is no longer held against rotation and may turn with the receptacle.

The result of this releasable attachment between the movable lid and the liner may be seen by reference to Fig. 3. As there shown, when receptacle 8 is rotated outwardly from its normal position, the lid is held stationary by means of the engaged members 22 and 23. Any portion of the receptacle extending outwardly from the lid is therefore uncovered so that access to the contents of that portion of the receptacle may be had. However, the uncovered portion of the receptacle is automatically re-covered as it is returned to its normal position. Since the lid 16 is held stationary the receptacle merely moves back under the lid to its original position wherein its entire top was covered by the lid. This same result will occur no matter in which direction the receptacle is rotated from its normal position. It may be rotated either in the clockwise direction or in the counterclockwise direction. In either case the portion of the receptacle extending forwardly of the lid will be automatically uncovered as it is moved to that outward position and will be re-covered as it is moved back to its normal position. The sliding engagement between the edges of the lid and the grooves of the receptacle permits this relative movement of the receptacle with respect to its lid without any binding therebetween.

Figure 4:
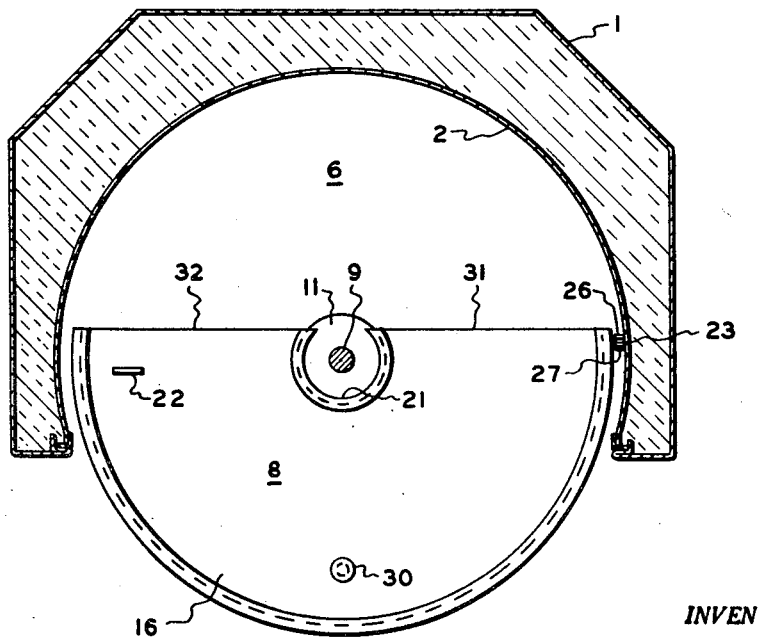
Fig. 4 is a diagrammatic sectional view showing the receptacle and its cover rotated to a position wherein they both may be removed from the refrigerator.

It may at times, however, be desirable to remove the entire receptacle from the refrigerator, and it is for that reason that the means attaching the lid to the liner are preferably made releasable. When they are released the frictional engagement between the edges of the lid and the receptacle will be such as to cause the lid to rotate with the receptacle. Thus, as is shown in Fig. 4, when the lid is released from attachment to the liner it will rotate outwardly with the receptacle, and they may be lifted together off their support and removed from the refrigerator. When they are again placed back in the refrigerator and returned to their normal position, the attachment between the lid and the liner may again be accomplished simply by pivoting the bifurcated member downwardly until its two prongs 26 and 27 lie on opposite sides of the block member 22 on the lid.

Figure 5:
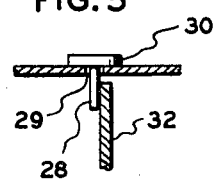
Fig. 5 is a fragmentary vertical section taken on the line 5—5 of Fig. 4.

In our preferred embodiment we have also provided stop means for limiting the amount of rotation of the receptacle from its normal position. Although not absolutely necessary, this stop means is provided in order to prevent the user from rotating the receptacle 8 so far that it disengages from the lid. This stop means in our preferred embodiment comprises a member which is mounted on the lid 16 on the line which would divide the lid into two equal halves. Specifically, as is best shown in Fig. 1 and Fig. 5, this member comprises a pin 28 which extends downwardly through an aperture 29 provided in the lid 16, an enlarged head portion 30 being formed on the pin to prevent it from falling completely through the aperture into the receptacle. Although the fit between the aperture 28 and the pin 29 is a relatively close one, the pin may be pulled upwardly through the aperture by means of its head 30 so as to clear the bottom edge of the lid 16.

Since the lid 16 normally remains stationary during the rotation of receptacle 8 due to its attachment to the liner 2, the pin 28 will also remain stationary. Therefore as the receptacle is rotated relative to the lid either the right or the left front wall of the receptacle will be moved toward the pin depending upon the direction the receptacle is turned. If the receptacle is rotated clockwise as viewed in Fig. 1 the left front wall 31 will approach the pin, whereas if it is turned counter-clockwise the right front wall 32 will approach the pin. In fact, if this rotation is continued through 90° the front wall moving towards the rear of the refrigerator will come into contact with the pin. Thus when the receptacle has been rotated counter-clockwise 90° to its position shown in Fig. 3, the right front wall 32 will come into contact with the pin and the pin will thereby act as a stop preventing further rotation of the receptacle. Conversely if the rotation of the receptacle were rotated clockwise for 90° from its normal position the left front wall 31 would contact the pin and be stopped thereby. The result that the rotation of the receptacle in either direction from its normal position is limited to approximately 90°.

If, however, it is desired to continue the rotation of the receptacle beyond that 90°, the pin member 28 may be pulled upwardly by its head 30 so that it clears the front walls 31 and 32. Then the rotation of the receptacle may be continued as far as desired, for example to the position shown in Fig. 4. Normally however the 90° rotation in either direction permitted by the pin when it is in its rotation limiting position will provide adequate access to all parts of the receptacle 8.

In order to increase the effectiveness of receptacle operation the lid 16 may be made of transparent material so that the contents of the receptacle are visible. This enables the user to be sure of initially turning the receptacle in the correct direction to reach the articles he wants.

In summation, it will be seen from the above that we have provided a new and improved rotatable receptacle structure for use in household refrigerators, in which the receptacle is automatically uncovered as it is rotated outwardly from its normal position and is automatically re-covered as it is returned to its normal position. Also, the means providing this automatic uncovering and re-covering are such that they may be released or inactivated to allow the lid to be rotated with the receptacle. This of course allows the lid and receptacle to be turned together to an outward position and removed from the refrigerator. Further we have included in our receptacle structure improved means for limiting the amount of rotation of the receptacle thereby to prevent disengagement of the parts of the structure through carelessness of the user.

In accordance with the patent statutes we have described what at present is considered to be the preferred embodiment of our invention, but it should be obvious to those skilled in the art that various changes and modifications may be made therein without departing from our invention, and we therefore aim in the appended claims to cover all such changes and modifications as fall within the true spirit and scope of our invention.

What we claim as new and desire to secure by Letters Patent of the United States is:

1. In a refrigerator cabinet having an inner liner defining a food storage compartment, a rotatable receptacle structure comprising a vertical shaft, a receptacle rotatably mounted on said shaft and having a normal position wherein it fits completely within said compartment, said receptacle having an access opening at the top thereof, a generally semi-circular lid having inner and outer curved edges, groove means formed on said receptacle for accommodating said edges to slidably support said lid on said receptacle and being effective to allow relative movement between said receptacle and said lid, said lid being adapted to cover said access opening when said receptacle is in said normal position, and means attaching said lid to said inner liner to cause said lid to be held stationary as said receptacle is rotated, whereby said access opening is uncovered by the relative motion between said lid and said receptacle upon the rotation of said receptacle outwardly from said normal position and re-covered upon the rotation thereof back into said normal position.

2. In a refrigerator cabinet having an inner liner defining a food storage compartment, a rotatable receptacle structure comprising a vertical shaft, a receptacle rotatably mounted on said shaft and having a normal position wherein it fits completely within said compartment, said receptacle having an access opening at the top thereof, a generally semi-circular lid having inner and outer curved edges, groove means formed on said receptacle for accommodating said edges to slidably support said lid on said receptacle and being effective to allow relative movement between said receptacle and said lid, said lid being adapted to cover said access opening when said receptacle is in said normal position, and means attaching said lid to said inner liner to cause said lid to be held stationary as said receptacle is rotated, whereby said access opening is uncovered by the relative motion between said lid and said receptacle upon the rotation of said receptacle outwardly from said normal position and re-covered upon the rotation thereof back into said normal position, and stop means for engaging said receptacle at a predetermined amount of rotation thereof in either direction from said normal position thereby to limit the rotation of said receptacle and the uncovering of said access opening to said predetermined amount.

3. The combination of claim 2 wherein said stop means are manually releasable and comprise a movable pin member mounted on said lid, said member being adapted in one position to engage a wall of said receptacle upon said receptacle being rotated said predetermined amount from said normal position and being manually movable from said one position to allow said receptacle to be rotated beyond said predetermined amount.

4. In a refrigerator cabinet having an inner liner defining a food storage compartment, a rotatable receptacle structure comprising a receptacle rotatably mounted in said storage compartment and having a normal position wherein it fits completely within said compartment, said receptacle having an access opening in the top thereof, a lid slidably mounted on said receptacle and adapted to cover said access opening when said receptacle is in said normal position, and manually releasable means attaching said lid to said inner liner to cause said lid to be held stationary as said receptacle is rotated, whereby said access opening is uncovered by the relative motion between said lid and said receptacle upon the rotation of said receptacle outwardly from said normal position and re-covered upon the rotation thereof back into said normal position, said releasable means including a pivoted bifurcated member and a block member releasably engaged by said bifurcated member, with one of said members being mounted on said lid and the other of said members being mounted on said liner whereby when said bifurcated member is disengaged from said block said lid is released from said liner for rotation with said receptacle.

5. The combination of claim 4 including manually releasable stop means for limiting the rotation of said receptacle in either direction from said normal position to a predetermined amount, said means being effective when said lid is attached to said liner and comprising a movable member mounted on said lid and adapted in one position to positively engage said receptacle after said predetermined amount of rotation thereof.

6. In a refrigerator cabinet having an inner liner defining a food storage compartment, a rotatable receptacle structure comprising a vertical shaft, a receptacle rotatably mounted on said vertical shaft and having a normal position wherein it fits completely within said compartment, said receptacle having an access opening in the top thereof, a generally semi-circular lid having inner and outer curved edges, groove means formed on said receptacle for accommodating said edges to slidably support said lid on said receptacle and being effective to allow relative movement between said receptacle and said lid, said lid being adapted to cover said access opening when said receptacle is in said normal position, and manually releasable means for attaching said lid to said inner liner to cause said lid to be held stationary as said receptacle is rotated, whereby said access opening is uncovered by the relative motion between said lid and said receptacle upon the rotation of said receptacle outwardly from said normal position and re-covered upon the rotation thereof back to said normal position, said means including a pivoted bifurcated member and a block member releasably engaged by said bifurcated member, with one of said members being mounted on said lid and the other of said members being mounted on said liner, whereby when said bifurcated member is disengaged from said block member said lid is released from said liner for rotation with said receptacle.

7. The combination of claim 6 including manually releasable stop means for limiting rotation of said receptacle in either direction from said normal position to a predetermined amount, said means being effective when said lid is attached to said liner and comprising a movable pin member mounted on said liner and adapted in one position to positively engage said receptacle after said predetermined amount of rotation thereof.

8. In a refrigerator cabinet having an inner liner defining a food storage compartment, a rotatable receptacle structure comprising a receptacle rotatably mounted in said storage compartment and having a normal position wherein it fits completely within said compartment, said receptacle having an access opening in the top thereof, a lid slidably mounted on said receptacle and adapted to cover said access opening when said receptacle is in said normal position, and means attaching said lid to said inner liner to cause said lid to be held stationary as said receptacle is rotated, whereby said access opening is uncovered by the relative motion between said lid and said receptacle upon the rotation of said receptacle outwardly from said normal position and re-covered upon the rotation thereof back into said normal position, and stop means for engaging said receptacle after a predetermined amount of rotation thereof in either direction from said normal position thereby to limit the rotation of said receptacle and the uncovering of said access opening to said predetermined amount, said stop means being manually releasable and including a movable pin member mounted on said lid, said pin member being adapted in one position to engage a wall of said receptacle upon said receptacle being rotated said predetermined amount from said normal position and being manually movable from said one position to allow said receptacle to be rotated beyond said predetermined amount.

References Cited in the file of this patent
UNITED STATES PATENTS

| | | |
|---|---|---|
| 438,486 | Pearson | Oct. 14, 1890 |
| 442,202 | Ritchie | Dec. 9, 1890 |
| 577,919 | Haire | Mar. 2, 1897 |
| 2,139,441 | Clarke | Dec. 6, 1938 |